US006461720B1

(12) United States Patent
Graff

(10) Patent No.: US 6,461,720 B1
(45) Date of Patent: Oct. 8, 2002

(54) CREPED ABSORBENT SHEET OF PAPER COMPRISING A DECORATIVE PATTERN OF PROTRUSIONS, AN EMBOSSING CYLINDER FOR SUCH A SHEET AND AN EMBOSSING METHOD

(75) Inventor: Pierre Graff, Wolfgantzen (FR)

(73) Assignee: Georgia-Pacific France, Kunheim (FR)

( * ) Notice: Subject to any disclaimer, the term of this patent is extended or adjusted under 35 U.S.C. 154(b) by 23 days.

(21) Appl. No.: 09/716,441

(22) Filed: Nov. 21, 2000

(30) Foreign Application Priority Data

Nov. 22, 1999 (EP) ........................................... 99402896

(51) Int. Cl.[7] ............................ B32B 3/00; D21H 11/00

(52) U.S. Cl. ....................... 428/154; 428/156; 428/172; 428/212; 162/109

(58) Field of Search ................................ 428/152, 153, 428/154, 156, 212; 162/109, 111

(56) References Cited

U.S. PATENT DOCUMENTS 3,414,459 A 12/1968 Wells
3,867,225 A 2/1975 Nystrand
5,382,464 A * 1/1995 Ruppel et al. .............. 428/172
5,620,776 A 4/1997 Schulz
6,149,768 A * 11/2000 Hepford ..................... 162/109

* cited by examiner

*Primary Examiner*—Donald J. Loney
(74) *Attorney, Agent, or Firm*—Breiner & Breiner, L.L.C.

(57) ABSTRACT

The invention relates to a sheet of paper which includes at least one decorative pattern (14, 16) which contrasts visually against the sheet's background (12) and which has a first series of generally truncated protrusions (22) projecting from one side (13) of the sheet and aligned in a design. In the invention, the sheet (10) includes a second series of protrusions associated with the first series (22) and of which each protrusion assumes the approximate form of a low wall projecting from a side (13) of the sheet and having a height which is less than the height of the protrusions (22) of the first series and of which each (24) bridges the two adjacent protrusions (22) of the first series to enhance the visual perception of the decorative unit (14, 16).

9 Claims, 3 Drawing Sheets

CREPED ABSORBENT SHEET OF PAPER COMPRISING A DECORATIVE PATTERN OF PROTRUSIONS, AN EMBOSSING CYLINDER FOR SUCH A SHEET AND AN EMBOSSING METHOD

FIELD OF INVENTION

The present invention relates to a sheet of paper, in particular to a sheet of absorbent paper made of creped cellulose cotton and comprising an embossing pattern.

More specifically, the invention concerns a sheet of paper constituted by at least one absorbent paper ply made of creped cellulose cotton and used in the household or in industry, that is being suitable as a rag, a paper towel, etc.

BACKGROUND OF THE INVENTION

In the field of sanitary or household papers, such as toilet paper or paper towels, it is well known to manufacture sheets of paper composed of several plies of absorbent paper, made, for example, of creped cellulose cotton, also referred to as tissue paper, of a specific surface weight between 12 and 30 g/m$^2$, which are provided with embossed protrusions.

Embossing imparts bulk to the sheet and improves liquid absorption, touch and softness. Attempts have been made to further increase absorptivity by creating multi-layer sheets by combining at least two layers, also called plies, each consisting of at least one embossed sheet.

Two ply embossing and joining modes are currently used depending on the desired properties of the final product.

The first mode is technically known as "nesting". It consists in first embossing the plies separately in order to forms protrusions which are substantially truncated or frusto-pyramidal. Next, an adhesive is deposited on the tops of the protrusions of one of the plies and these plies are configured in such a manner that the sides including the protrusions are opposite one another, the protrusions of one side being situated between the protrusions of the other side. Lastly, the plies are joined in such a manner that glue-coated protrusions nest between the protrusions of the other ply. In this manner, the two are connected by glue spots between the protrusion peaks of one ply and the unembossed zones of the other ply. The structure so attained has voids arrayed to impart improved absorption to the sheet. Moreover, the sheet's outsides feel smooth and velvety because of the hollows subtended on the back of the protrusions. This technique is described in U.S. Pat. No. 3,867,225.

The second joining procedure is known as tip-to-tip. It differs form the joining mode above by the relative configuration of the two plies. After having been separately embossed, the plies are mounted one on the other so that the tops of the protrusions coincide. The plies are connected to each other by the protrusion tops, tip-to-tip. This technique is illustrated in U.S. Pat. No. 3,414,459.

As regards the practical designs of those structures, whether nested or tip-to-tip, the embossed protrusions mostly are distributed in a pattern whereby the protrusions are aligned in uniform manner in one or more directions. Such a pattern makes possible a mechanically homogenous sheet, but on the other hand its aesthetic appeal is mediocre.

OBJECTS AND BRIEF DESCRIPTION OF THE INVENTION

In particular, for the purpose of improving product appearance, applicant has created patterns wherein the protrusions are configured at least in part along certain curves, portions of curves or straight lines, or wherein there are combinations of such portions of curves and/or straight lines. In particular, some of the portions are at least partly mutually parallel. In particular, the protrusions subtend closed curves including circles or arcs of circle that may be concentric.

The objective of the invention is to improve such designs, especially as regards improving appearance.

For that purpose the invention proposes a sheet composed of at least one ply of creped cellulose cotton or tissue paper of a specific surface weight between 12 and 30 g/m$^2$ and having an embossed pattern including a first series of narrow protrusions in the form of embossed tips projecting from one side of the ply and subtending alignments, characterized in that the ply includes a second series of protrusions in association with the first series and in an approximate shape of a low wall, the low wall protrusions projecting from the ply side, and their salient height being less than the height of the protrusions of the first series, each low wall protrusion bridging two adjacent protrusions along the alignments of the first series so as to enhance the visual attraction of the pattern.

In other features of the invention:

- the pattern includes at least a first series of protrusions which are aligned along closed-loop designs/geometries and two consecutive protrusions of this first series are interconnected by a small wall-shaped protrusion which is part of the associated second series of protrusions, the designs in particular including at least segments of curves,
- the pattern includes several first and second series of protrusions to constitute several concentric closed-loop designs,
- the sheet includes several embossing patterns,
- when the sheet is an absorbent multi-layer sheet or at least two layers or plies, at least one ply is a sheet of the invention,
- each of the external plies includes of a sheet of the invention,
- the protrusions project from the inside surface of the external ply,
- the multi-layer sheet includes two plies and the associated protrusion series are nested between the associated protrusion series of the other of the two plies.

Furthermore, the invention proposes an engraved cylinder to emboss a sheet of the invention that includes a first series of generally truncated embossing tips which constitute alignments, characterized in that the cylinder includes a second series of embossing protrusions of which the tops' height is less than that of the embossing tips of the first series, the second series protrusions in particular being thinner than those of the first series.

Lastly, the invention proposes a method for embossing a sheet using a cylinder of the invention and characterized in that the sheets are embossed until they come to rest on the small wall protrusions.

Other features and advantages of the invention are elucidated in the comprehensive description below and in relation to the attached drawings.

DESCRIPTION OF PRESENTLY PREFERRED EMBODIMENTS

Figure 1:
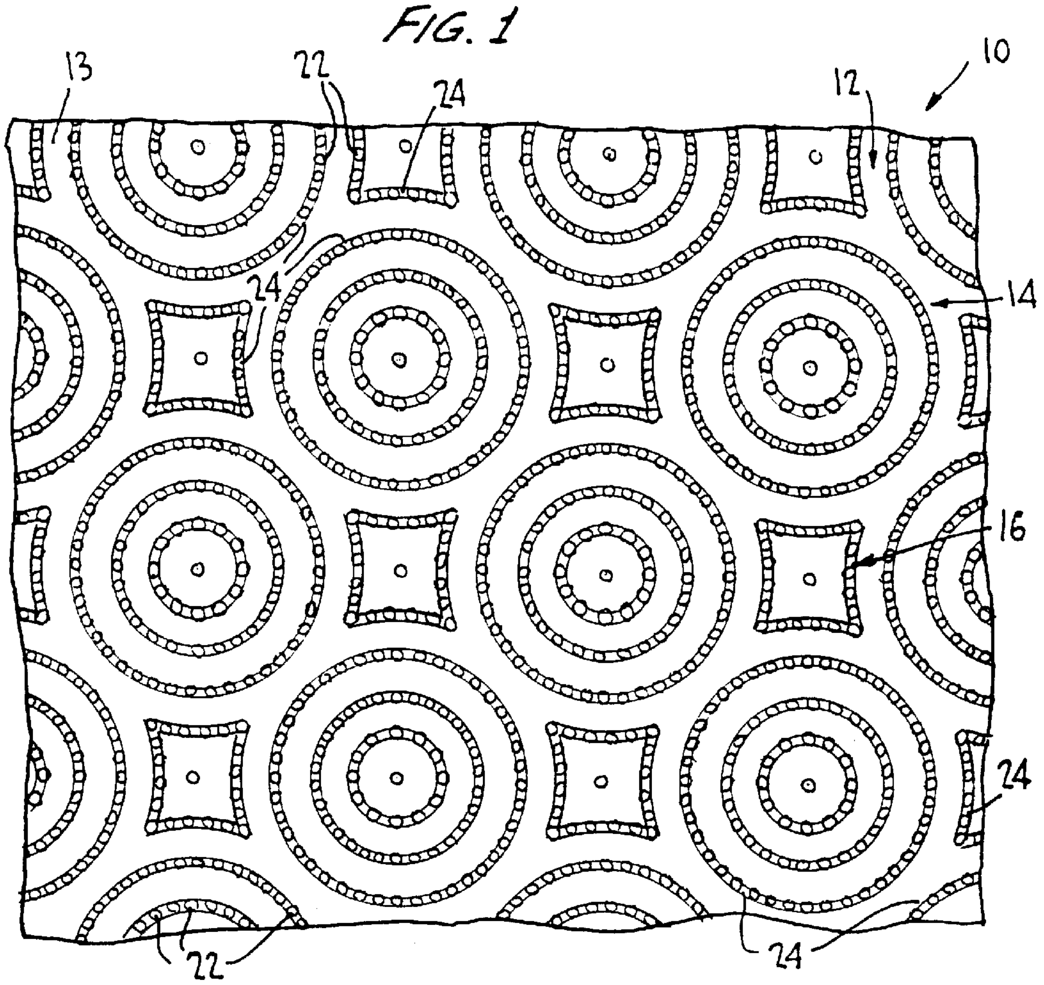
FIG. 1 is a top view of an illustrative embodiment of an embossed paper sheet made according to the present invention, and more specifically a paper towel sheet.

FIG. 1 shows an illustrative embodiment of an embossed sheet of paper made of creped cellulose cotton or tissue paper for use in all kinds of sanitary or household products. Preferably, the tissue paper is of a specific surface weight between 12 and 30 m/g$^2$ is of the sort made by conventional wet pressing and called CWP.

More specifically, the sheet paper shown in FIG. 1 is an external ply of a sheet of paper, for example intended to be integrated into a paper towel roll.

Following embossing, the background 12 of the sheet 10 illustratively is unembossed and a pattern of repeated and mutually staggered elements 14 and 16 is visible and contrasts with the sheet background 12.

The pattern elements 14 and 16 represent a conventionally known design and include a series of protrusions aligned into designs/geometries, in particular into closed loops, for example, circles or squares with rounded sides. Several closed loops are configured concentrically as shown by FIG. 1.

Figure 2:
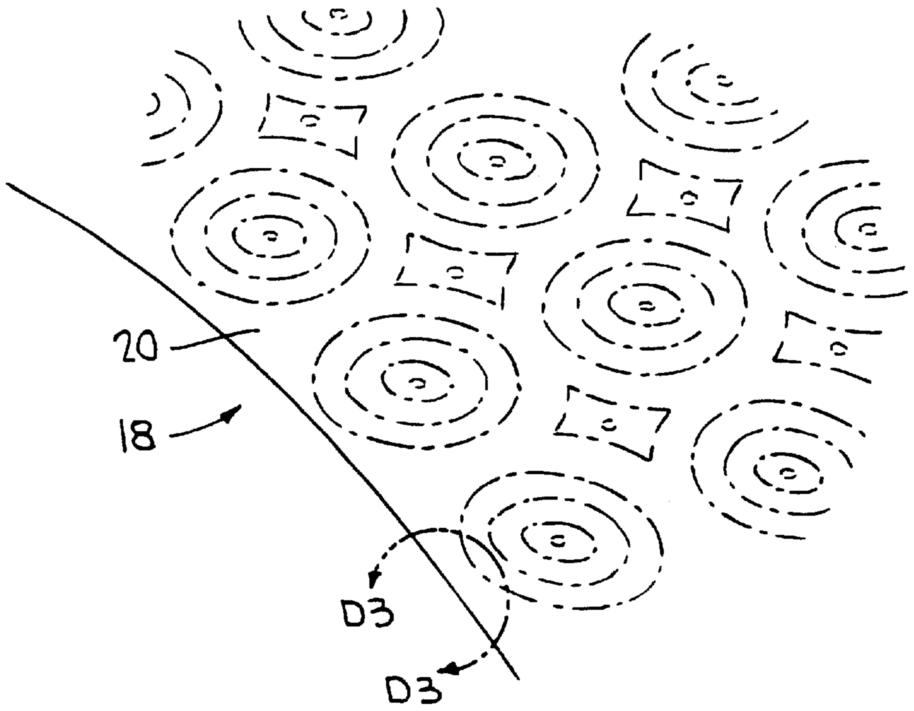
FIG. 2 is a schematic perspective illustrating the convex, cylindrical surface of an embossing cylinder for a sheet of FIG. 1.
Figure 3:
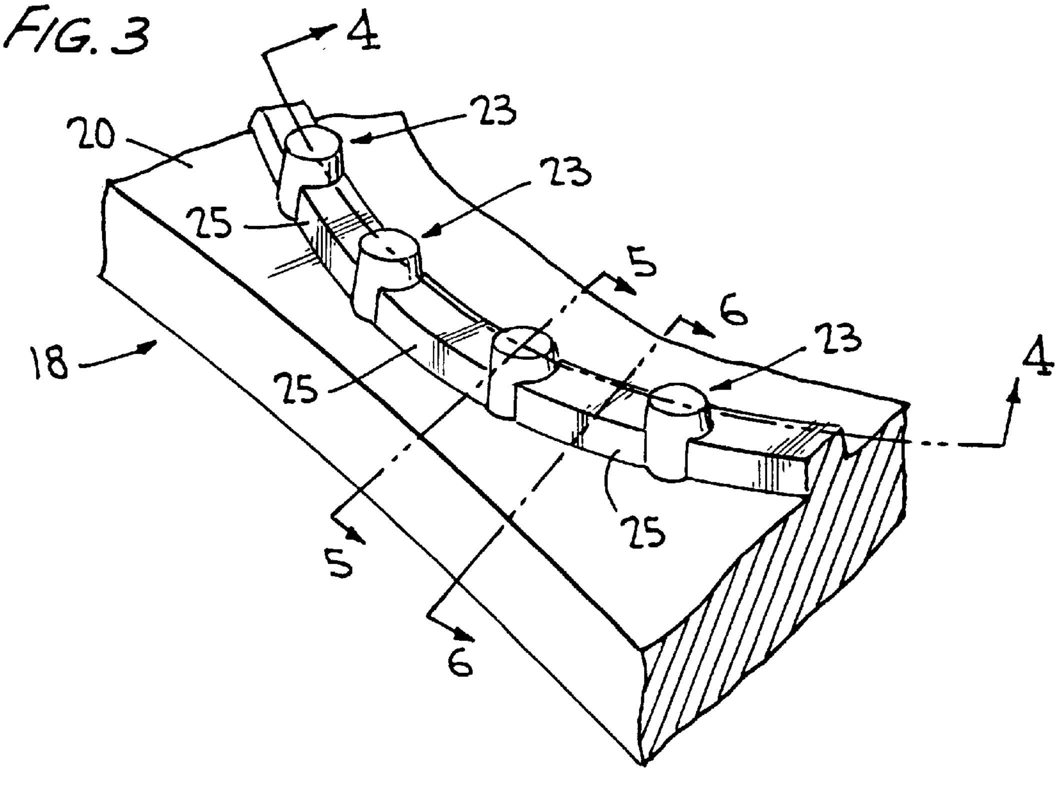
FIG. 3 is a highly enlarged view of the detail D3 of FIG. 2.

In a known technique, the pattern elements are implemented by embossing the sheet 10 using a cylinder 18 which is illustratively shown in FIGS. 2 and 3 on the external surface of a convex cylinder 20 on the surface of which are embossing protrusions which match the embossings in the sheet of paper.

In a known embodiment, each design, in particular of a closed loop, that participates in the generation of the pattern visually contrasting against the sheet's background, includes a first series of protrusions 22, each of which is a projecting truncated tip, that is, these protrusions or tips of the first series project above the background 12 of the sheet 10.

In order to impress a series of protrusions 22 into the sheet 10, the embossing cylinder 18 includes on its concave cylindrical surface a first coincident series of truncated salient embossing tips 23.

Under the disclosure of the present invention and in order to enhance user's visual perception of the decorative pattern implemented by protrusions 22, the sheet includes, in each design, a second associated series of protrusions 24 each of which is in the approximate shape of a low wall.

Each low wall protrusion 24 of the second series runs as a salient above the background 12 of the sheet 10 in the same manner as the first series of protrusions 22.

In order to produce low wall protrusions 24, the convex, external, cylindrical side 20 of the embossing cylinder 18 includes a second associated series of embossed low wall protrusions 25 which coincide with those to be implemented in the sheet.

Two consecutive truncated protrusions 22 are connected to each other by one low wall 24.

Figure 4:
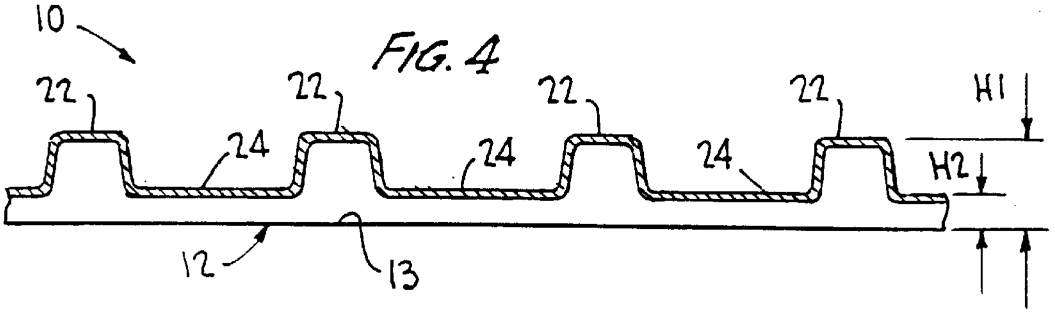
FIGS. 4, 5, 6 are detailed cross-sectional views of the sheet of FIG. 1 along the lines 4—4, 5—5 and 6—6 of FIG. 3.
Figure 5:
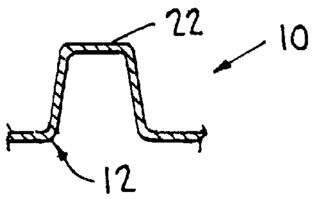
Figure 6:
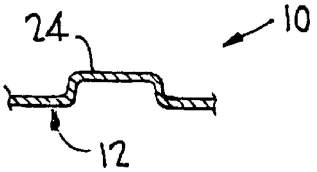

As shown in particular by FIG. 4, the height Hi of protrusions 22 exceeds the height H2 of low walls 24.

Illustratively and as regards the corresponding heights of the embossing tips 23 and of low walls 25 of a salient topography on the cylinder 18 and used in embossing a sheet of a paper towel, the height of the embossing tips 23 is 1.3 mm whereas the height of low walls 25 is 0.7 mm. With such a cylinder cooperating with another cylinder clad with a suitable rubber, a 22 g/m$^2$ cellulose cotton ply was embossed to an average height Hi of about 0.8 mm.

Thanks to the presence of two associated series of protrusions 22 and 24, user's perception of the salient decorative pattern in the sheet 10 is enhanced relative to the state of the art.

At most, the height of the embossing low walls on the embossing cylinder equals the height of the first series of embossing tips, in the present example being 1.3 mm. Preferably and in order to enhance the pattern's visibility, the height differential is selected in such a manner that the rubber may come into contact with the upper surface of the low wall at the time of embossing and in this manner adapts as least partly the sheet to the shape of the low wall.

In general, the embossing tips are frustra of circular, oval, polygonal or other cross-sections, and preferably their slope is steep, for example being between 60° and 70°. The thickness of the low walls is less than that of the embossing tips and preferably their slope is the same as that of the tips.

The invention is not restricted to a single ply sheet.

The invention also applies to a multi-layer sheet, for example, of two plies (or layers) manufactured in the manner of the invention.

In this latter embodiment, the protrusions 22 and 24 preferably project from the inside surface of each of the two plies of the multi-layer sheet, in a design known per se, in order to increase the sheet's thickness as well as to hook up the two plies by the free ends of the embossed tips 22. The two plies in this instance are joined in a nested manner as already described above.

The design of the invention advantageously allows implementing a wide variety of patterns.

Tests were run to check that the present invention leaves product performance undegraded, because any additional embossing ipso facto reduces, for example, the mechanical strength or may entail a drop in absorption.

A first product A is a paper including two plies combined in the nesting manner of the prior art. This is a product in the form of the paper towel marketed in France under the Trademark OKAY. The pattern has of concentric circles staggered with mutually offset protrusions, such as shown in the Figures, however without the low walls of the invention.

The second product B was made from two plies of the same tissue paper as above but embossed in the manner of the present invention with the pattern shown in the Figures.

The third product C also was made from two plies but with an embossing having protrusions of which the surface at the top is continuous, in the form of a circle. The pattern thus has continuous circles.

An appropriate rubber and different embossing pressures measured by the width of impression I were used, the respective widths being 16, 20, 22 and 24 mm. The results are shown in the Table below.

| | Thickness (mm) | Dry mechanical strength (N/m/2 plies) MD:CD | Wet mechanical strength (N/m/2 plies) CD | Absorption Afnor ($cm^3/g$) |
|---|---|---|---|---|
| 2 unembossed plies (44 $g/m^2$) | 0.19 | 816:620 | 146 | 4.6 |
| A - I = 16 | 0.61 | 727:477 | 113 | 6.7 |
| A - I = 20 | 0.80 | 653:368 | 92 | 8.1 |
| A - I = 22 | 0.83 | 632:348 | 87 | 8.4 |
| A - I = 24 | 1.95 | 534:297 | 76 | 9 |
| B - I = 16 | 0.55 | 776:495 | 116 | 6.2 |
| B - I = 20 | 0.76 | 623:346 | 83 | 8.0 |
| B - I = 22 | 0.77 | 643:340 | 81 | 8.2 |
| B - I = 24 | 0.90 | 539:276 | 68 | 9.0 |
| C - I = 16 | 0.49 | 842:575 | 126 | 5.6 |
| C - I = 20 | 0.72 | 695:340 | 83 | 7 |
| C - I = 22 | 0.77 | 647:267 | 68 | 7.6 |
| C - I = 24 | 0.87 | 591:250 | 62 | 7.9 |

Figure 7:
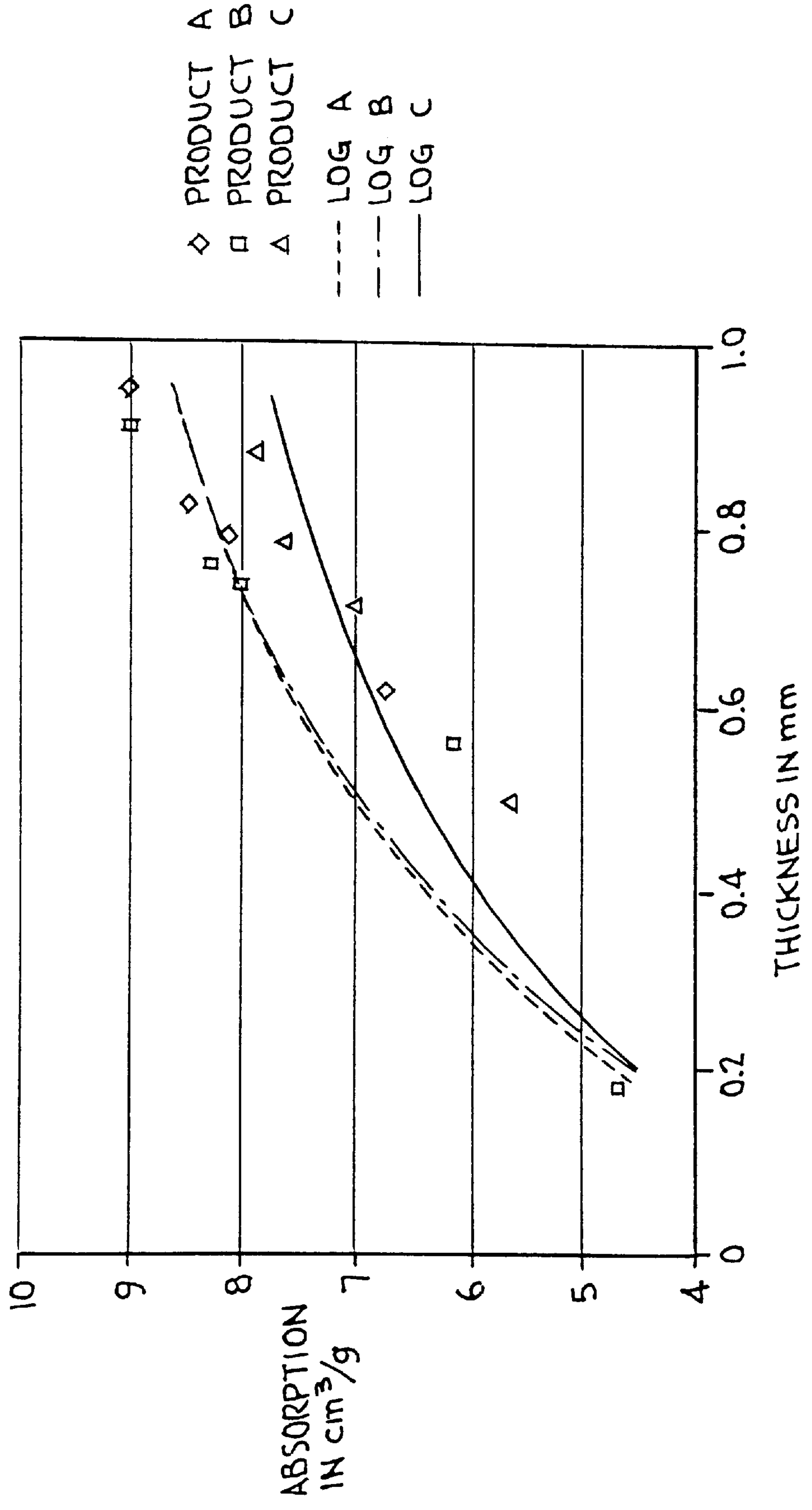
FIG. 7 is a graph illustrating absorption as a function of thickness for various sheet designs, one sheet being made according to the present invention.

The results listed in the Table were plotted in FIG. 7. The curves show the absorption as a function of thickness for the three products A, B and C. FIG. 7 shows that the product B incurred no loss of absorption in spite of additional embossing, and contrary to the case for the product C.

The same phenomenon is noted regarding the wet strength as a function of thickness, i.e., of embossing pressure. No significant loss is observed in the product of the invention.

Accordingly, the invention allows making products offering improved sharpness of the decorative pattern without incurring significant degradations of its properties.

Compared to the prior design lacking the low walls, the invention also allows increasing the number of embossing tips on the engraved cylinder while preserving the distance between two consecutive embossing tips, thereby improving pattern visibility.

As will be apparent to one skilled in the art, various modifications can be made within the scope of the aforesaid description. Such modifications being within the ability of one skilled in the art form a part of the present invention and are embraced by the appended claims.

It is claimed:

1. An embossed sheet comprising at least one paper ply of a specific surface weight between 12 and 30 $g/m^2$; and said at least one ply comprising an embossing pattern having a first series of substantially truncated protrusions projecting from a first side of the at least one ply and constituting alignments, a second series of protrusions where each protrusion of said second series of protrusions is of a shape of a low wall projecting from said first side and having a height (H2) which is less than a height (H1) of the protrusions of the first series, and wherein each protrusion of the second series bridges two adjacent protrusions of said first series along said alignments in a manner to enhance visual perception of the embossing pattern.

2. The embossed sheet as claimed in claim 1 wherein said first series of protrusions are aligned in at least one closed-loop design and wherein two consecutive protrusions of the first series of protrusions are bridged to each other by one of said protrusions of said second series.

3. The embossed sheet as claimed in claim 2 wherein the at least one closed-loop design comprises at least one segment which is a curve.

4. The embossed sheet as claimed in claim 2 wherein said first series of protrusions and said second series of protrusions together form several concentric closed loops.

5. An absorbent multi-ply sheet comprising at least two plies, wherein at least one outer ply is a sheet as claimed in any one of claims 1, 2, 3, or 4.

6. An absorbent multi-ply sheet comprising at least two plies, wherein each outer ply is a sheet as claimed in any one of claims 1, 2, 3 or 4.

7. The multi-ply sheet as claimed in claim 5 wherein said protrusions project inward on the sheet.

8. The multi-ply sheet as claimed in claim 6 wherein said protrusions project inward on the sheet.

9. The multi-ply sheet as claimed in claim 6 wherein said multi-ply sheet comprises only two plies and said protrusions of one of the two plies nest between said protrusions of the other of the two plies.

* * * * *

UNITED STATES PATENT AND TRADEMARK OFFICE
CERTIFICATE OF CORRECTION

PATENT NO. : 6,461,720 B1
DATED : October 8, 2002
INVENTOR(S) : Pierre Graff

It is certified that error appears in the above-identified patent and that said Letters Patent is hereby corrected as shown below:

Column 4,
Line 1, "Hi" should read -- H1 --.
Line 11, "Hi" should read -- H1 --.

Column 6,
Line 30, "3, or 4" should read -- 3 or 4 --.

Signed and Sealed this

Fourth Day of February, 2003

JAMES E. ROGAN
*Director of the United States Patent and Trademark Office*